United States Patent

Endo

(12) United States Patent
(10) Patent No.: US 6,912,093 B2
(45) Date of Patent: Jun. 28, 2005

(54) OPTICAL GLASS, PRESS-MOLDING GLASS GOB AND OPTICAL ELEMENT

(75) Inventor: Michio Endo, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/744,074

(22) Filed: Dec. 24, 2003

(65) Prior Publication Data

US 2004/0145815 A1 Jul. 29, 2004

(30) Foreign Application Priority Data

Dec. 27, 2002 (JP) ........................ 2002-381147

(51) Int. Cl.$^7$ ............... G02B 11/00; C03B 35/00
(52) U.S. Cl. ........................ 359/642; 65/25.1
(58) Field of Search ............ 359/642; 351/159; 65/24, 25.1; 501/47

(56) References Cited

U.S. PATENT DOCUMENTS

| | | | |
|---|---|---|---|
| 3,958,999 A | | 5/1976 | Izumitani et al. ............ 501/51 |
| 2002/0062660 A1 | * | 5/2002 | Yoshikuni et al. ........... 65/25.1 |
| 2004/0187521 A1 | * | 9/2004 | Sato ........................... 65/25.1 |

FOREIGN PATENT DOCUMENTS

| | | |
|---|---|---|
| EP | 1 245 544 A | 10/2002 |
| JP | 53-4023 | 1/1978 |

OTHER PUBLICATIONS

Database WPI, Section Ch, Week 197437, Derwent Publications Ltd., XP002277224 & JP 49 021408 A, Feb. 25, 1974 (abstract).

* cited by examiner

*Primary Examiner*—Scott J. Sugarman
*Assistant Examiner*—M. Hasan
(74) *Attorney, Agent, or Firm*—Nixon & Vanderhye P.C.

(57) ABSTRACT

An optical glass whose refractive index is high and whose coloring is decreased comprising, by weight %, 2 to 45% of $B_2O_3$, 0 to 30% of $SiO_2$ provided that the content of $B_2O_3$>the content of $SiO_2$, 10 to 50% of $La_2O_3$, 0 to 30% of $TiO_2$, 0 to 15% of ZnO, 0 to 15% of $ZrO_2$, 0 to 35% of $Nb_2O_5$, 0 to 35% of BaO, 0 to 5% of SrO, 0% or more but less than 8% of CaO, 0% or more but less than 13% of MgO, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$.

18 Claims, No Drawings

OPTICAL GLASS, PRESS-MOLDING GLASS GOB AND OPTICAL ELEMENT

This application claims priority to Japan Application No. 2002-381147, filed 27 Dec. 2002. The entire contents of this application are incorporated herein by reference.

FIELD OF THE INVENTION

The present invention relates to an optical glass, a press-molding glass gob (a glass gob for press-molding) and an optical element. More specifically, the present invention relates to an optical glass whose refractive index is high and whose coloring is decreased, a press-molding glass gob formed of the optical glass and an optical element formed of the optical glass.

TECHNICAL BACKGROUND

In recent years, with the wide spread of digital cameras, small lenses are increasingly demanded. A high-refractivity glass is suitable as an optical glass material for producing such small lenses. However, any conventional glass has a disadvantage that the coloring tendency of the glass is increasingly intensified with an increase in refractive index. Particularly, a digital camera uses CCD as an image-sensing device, and it therefore has a problem that the sensitivity to blue on the short wavelength side out of three primary colors is attenuated when an entire image-sensing unit is taken into account. JP-A-53-4023 discloses a high-refractivity low-dispersion optical glass as a glass for use in the above field. The problem with this glass is that it is required to use expensive $HfO_2$.

SUMMARY OF THE INVENTION

Under the circumstances, it is an object of the present invention to provide an optical glass whose refractive index is high and whose coloring is decreased, a press-molding glass gob formed of the above optical glass and an optical element formed of the above optical glass.

For achieving the above object, the present inventor has made diligent studies and as a result has found that the above object can be achieved by an optical glass having a specific glass composition. The present invention has been completed on the basis of the above finding.

That is, the subject matters of the present invention are as follows.

(1) An optical glass comprising, by weight %, 2 to 45% of $B_2O_3$, 0 to 30% of $SiO_2$ provided that the content of $B_2O_3$>the content of $SiO_2$, 10 to 50% of $La_2O_3$, 0 to 30% of $TiO_2$, 0 to 15% of ZnO, 0 to 15% of $ZrO_2$, 0 to 35% of $Nb_2O_5$, 0 to 35% of BaO, 0 to 5% of SrO, 0% or more but less than 8% of CaO, 0% or more but less than 13% of MgO, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$.

(2) The optical glass of above (1), which has an refractive index (nd) of 1.8 to 2.1 and an Abbe's number (vd) of 20 to 40.

(3) The optical glass of above (1), which contains 2 to 45% of $B_2O_3$, 0 to 30% of $SiO_2$, provided that the content of $B_2O_3$>the content of $SiO_2$, 10 to 50% of $La_2O_3$, 0 to 30% of $TiO_2$, 0 to 15% of ZnO, 0 to 15% of $ZrO_2$, 0 to 35% of $Nb_2O_5$, 0 to 35% of BaO, 0 to 5% of SrO, 0% or more but less than 8% of CaO, 0% or more but less than 13% of MgO, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$, and has a refractive index of more than 1.86 but up to 2.1, wherein the optical glass exhibits $\lambda_{70}$ at 460 nm or less.

(4) The optical glass of above (1), which contains 2 to 45% of $B_2O_3$, 0 to 30% of $SiO_2$, provided that the content of $B_2O_3$>the content of $SiO_2$, 10 to 50% of $La_2O_3$, 0 to 30% of $TiO_2$, 0 to 15% of ZnO, 0 to 15% of $ZrO_2$, 0 to 35% of $Nb_2O_5$, 0 to 35% of BaO, 0% or more but less than 2% of SrO, 0% or more but less than 8% of CaO, 0% or more but less than 13% of MgO, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$, and has a refractive index of 1.8 to 1.86, wherein the optical glass exhibits $\lambda_{70}$ at 460 nm or less.

(5) The optical glass of above (1), which contains 2 to 45% of $B_2O_3$, 0 to 30% of $SiO_2$, provided that the content of $B_2O_3$>the content of $SiO_2$), 10 to 50% of $La_2O_3$, 0 to 30% of $TiO_2$, 0 to 15% of ZnO, 0 to 15% of $ZrO_2$, 0 to 35% of $Nb_2O_5$, 0 to 35% of BaO, 0% or more but less than 1% of SrO, 0% or more but less than 8% of CaO, 0% or more but less than 13% of MgO, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$, and has a refractive index of 1.8 to 2.1, wherein the optical glass exhibits $\lambda_{70}$ at 460 nm or less.

(6) The optical glass of above (1), which contains 2 to 45% of $B_2O_3$, 0 to 30% of $SiO_2$, provided that the content of $B_2O_3$>the content of $SiO_2$), 10 to 50% of $La_2O_3$, 0 to 30% of $TiO_2$, 0 to 15% of ZnO, 0 to 15% of $ZrO_2$, 0 to 35% of $Nb_2O_5$, 0 to 35% of BaO, 0 to 0.8% of SrO, 0 to 7% of CaO, 0 to 12% of MgO, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0 to 0.4% of $WO_3$, 0 to 1.2% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0 to 1.8% of $Sb_2O_3$ and 0 to 1% of $SnO_2$, wherein the optical glass exhibits $\lambda_{70}$ at 460 nm or less.

(7) The optical glass of above (1), which contains 2 to 45% of $B_2O_3$, 0 to 30% of $SiO_2$, provided that the content of B203>the content of $SiO_2$), 10 to 50% of $La_2O_3$, 0 to 30% of $TiO_2$, 0 to 15% of ZnO, 0 to 15% of $ZrO_2$, 0 to 35% of $Nb_2O_5$, 0 to 35% of BaO, 0% or more but less than 1% of SrO, 0% or more but less than 8% of CaO, 0% or more but less than 13% of MgO, provided that the total content of BaO, SrO, CaO and MgO is 0 to 40%, 0 to 20% of $Gd_2O_3$, 0% or more but less than 2% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$.

(8) The optical glass of above (7), which contains 3 to 24% of $B_2O_3$, 0 to 18% of $SiO_2$, provided that the weight ratio of the content of $B_2O_3$/the content of $SiO_2$ is at least 1.1 or that no $SiO_2$ is contained, 18 to 47% of $La_2O_3$, 0 to 26% of $TiO_2$, 0 to 12% of ZnO, 0 to 10% of $ZrO_2$, 0 to 30% of $Nb_2O_5$, 0 to 32% of BaO, 0 to 10% of $Gd_2O_3$ and 0 to 4% of $Yb_2O_3$.

(9) The optical glass of above (7) or (8), which contains 1 to 5% of ZnO.

(10) The optical glass of above (1), wherein the total content of $B_2O_3$, $SiO_2$, $La_2O_3$, ZnO, $ZrO_2$, $Nb_2O_5$, $TiO_2$, BaO, CaO, SrO, $Gd_2O_3$, $Y_2O_3$, $Ta_2O_5$, $WO_3$, $Na_2O$, $K_2O$, $Li_2O$, $GeO_2$, $Yb_2O_3$, $Sb_2O_3$ and $SnO_2$ is 99% or more.

(11) The optical glass of above (10), wherein the total content of $B_2O_3$, $SiO_2$, $La_2O_3$, ZnO, $ZrO_2$, $Nb_2O_5$, $TiO_2$, BaO and $Sb_2O_3$ is 99% or more.

(12) The optical glass of above (11), which contains all of $B_2O_3$, $SiO_2$, $La_2O_3$, ZnO, $ZrO_2$, $Nb_2O_5$, $TiO_2$ and BaO.

(13) The optical glass of above (1), which contains $TiO_2$.

(14) A press-molding glass gob which is formed of the optical glass recited in above (1) and is to be softened under heat and press-molded.

(15) An optical element formed of the optical glass recited in above (1).

According to the present invention, there is provided an optical glass whose refractive index is high and whose coloring is reduced.

According to the present invention, further, there is provided a press-molding glass gob for producing, by press-molding, an optical element formed of an optical glass whose refractive index is high and whose coloring is decreased.

Further, according to the present invention, there is provided an optical element formed of an optical glass whose refractive index is high and whose coloring is decreased.

PREFERRED EMBODIMENTS OF THE INVENTION

The optical glass of the present invention comprises, by weight %, 2 to 45% of $B_2O_3$, 0 to 30% of $SiO_2$ provided that the content of $B_2O_3$>the content of $SiO_2$, 10 to 50% of $La_2O_3$, 0 to 30% of $TiO_2$, 0 to 15% of ZnO, 0 to 15% of $ZrO_2$, 0 to 35% of $Nb_2O_5$, 0 to 35% of BaO, 0 to 5% of SrO, 0% or more but less than 8% of CaO, 0% or more but less than 13% of MgO, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$.

According to the above optical glass, a high transmittance can be obtained in a visible light region, and particularly, a high transmittance can be obtained in the short wavelength region of the visible light region.

Further, there can be obtained an optical glass that is more stabilized in the ranges of a refractive index (nd) of 1.8 to 2.1 and an Abbe's number (vd) of 20 to 40.

The above compositional ranges will be explained in detail below. The following content by % in each component below represents weight %.

$B_2O_3$ is a component effective as an oxide for forming a glass network of the above glass and is also effective for decreasing the temperature for meltability and flow viscosity of the glass, and at least 2% of $B_2O_3$ is required. However, the content of $B_2O_3$ exceeds 45%, the refractive index decreases. The content of $B_2O_3$ is therefore limited to 2 to 45%, and it is preferably 3 to 24%, more preferably 5 to 18%.

$SiO_2$ works to maintain the devitrification resistance of the above glass. When incorporated, $SiO_2$ works as a component for forming a glass network. However, when the content of $SiO_2$ exceeds 30%, the meltability of the glass is degraded, and it is difficult to produce the glass stably. The content of $SiO_2$ is therefore limited to 0 to 30%, and it is preferably 0 to 18%, more preferably 1 to 18%.

Further, when the content of $B_2O_3$ is smaller than the content of $SiO_2$, the glass comes to be easily colored, and the glass is degraded in meltability and devitrification resistance, so that more $B_2O_3$ is incorporated than $SiO_2$.

$La_2O_3$ is an essential component for obtaining a high-refractivity low-dispersion glass. When the content of $La_2O_3$ is less than 10%, the refractive index decreases, and when it is larger than 50%, the devitrification resistance decreases, so that it is difficult to obtain a glass that can be stably produced. The content of $La_2O_3$ is therefore limited to 10 to 50%, and it is preferably 18 to 47%, more preferably 25 to 47%.

$TiO_2$ is a component for improving the glass in chemical durability and devitrification resistance while adjusting optical properties such as a refractive index and an Abbe's number. For imparting the glass with the above properties, it is required to incorporate 0 to 30% of $TiO_2$, and the content thereof is preferably 0 to 26%, more preferably 1 to 26%, still more preferably 8 to 26%.

ZnO is a component for imparting the glass with high refractivity and low-dispersion properties (the degree of dependency of the refractive index on wavelengths is small), and it is also a component for improving the glass in devitrification resistance and decreasing the temperature for viscous flowability. When the content of ZnO is larger than 15%, the degree of devitrification increases, and it is difficult to obtain a glass that can be stably produced. The content of ZnO is therefore limited to 0 to 15%, and it is preferably 0 to 12%. When a proper amount of ZnO is added, the spectral transmittance on the short wavelength end sharply rises. Therefore, the content of ZnO is preferably more than 0%, but not more than 5%, more preferably 0.5 to 5%, still more preferably 1 to 5%.

$ZrO_2$ is a component for producing a high refractive index, and when added in a small amount, it has an effect that the glass is improved in devitrification resistance. However, when the content thereof exceeds 15%, the devitrification resistance decreases, and the meltability of the glass is also degraded. The content of $ZrO_2$ is therefore limited to 0 to 15%, and it is preferably 0 to 10%, more preferably 1 to 10%.

$Nb_2O_5$ is a component for imparting the glass with a high refractive index, and it also has an effect that the glass is improved in devitrification. The content of $Nb_2O_5$ is properly 0 to 35%. When the content of $Nb_2O_5$ exceeds 35%, the absorption on the short wavelength side is intensified, and the coloring tendency is intensified. The content of $Nb_2O_5$ is preferably 0 to 30%, more preferably 1 to 30%, still more preferably 1 to 20%, further more preferably 1 to 15%.

When used in the form of carbonate or nitrate as raw materials, BaO, SrO, CaO and MgO have an effect that the defoaming of the glass is promoted.

When added in an amount of 0 to 35%, BaO has an effect that the glass is improved in coloring. When the content of BaO exceeds 35%, however, the devitrification resistance is degraded. The content of BaO is preferably 0 to 32%, more preferably 1 to 32%, still more preferably 1 to 25%.

SrO may be added in an amount of 0 to 5% as a substitute for BaO. Similarly, 0% or more but less than 8% of CaO and 0% or more but less than 13% of MgO may be added. SrO can improve the glass in devitrification resistance when the glass is re-heated and molded, so that the content of SrO is preferably 0% or more but less than 1%. Particularly, when the refractive index (nd) is 1.8 to 1.86, it is required to take care of a decrease in the above devitrification resistance. When the refractive index (nd) is 1.8 to 1.86, preferably, the content of SrO is adjusted to 0% or more but less than 1%, and when refractive index (nd) is more than 1.86 to 2.1, preferably, the content of SrO is adjusted to 0 to 5%. When the refractive index (nd) is 1.8 to 2.1, more preferably, the content of SrO is adjusted to 0 to 0.8%.

Further, when the total content of BaO, SrO, CaO and MgO exceeds 40%, the glass is degraded in devitrification resistance, and it is difficult to obtain a glass that can be stably produced. The total content of BaO, SrO, CaO and MgO is therefore limited to 0 to 40%.

$Gd_2O_3$ can be added in an amount up to 20% as a substitute for $La_2O_3$. When the content of $Gd_2O_3$ exceeds 20%, the glass is degraded in devitrification resistance, and it is difficult to obtain a glass that can be stably produced. The content of $Gd_2O_3$ is therefore limited to 0 to 20%, and it is preferably 0 to 10%.

$Y_2O_3$ and $Yb_2O_3$ can be also added in an amount of 0 to 15% and 0 to 10%, respectively, as substitutes for $La_2O_3$. However, when the contents of these components exceed the above upper limits, the glass is degraded in devitrification resistance, and it is difficult to obtain a glass that can be stably produced. Preferably, the content of $Y_2O_3$ is 0% or more but less than 2%, and the content of $Yb_2O_3$ is 0 to 4%. The content of $Y_2O_3$ is more preferably in the range of 0 to 1.5%.

$Ta_2O_5$ is a component for imparting the glass with high-refractivity and low-dispersion properties and is useful for forming a low-dispersion glass. However, when the content of $Ta_2O_5$ exceeds 18%, the glass is degraded in meltability. The content of $Ta_2O_5$ is therefore properly 0 to 18%.

$WO_3$ is a component for improving the glass in devitrification resistance when added in a small amount. However, when the content of $WO_3$ exceeds 0.5%, the absorption of light in a short wavelength region by the glass is intensified, and the glass is strongly liable to be colored. The content of $WO_3$ is therefore limited to 0% or more but less than 0.5%, and it is preferably 0 to 0.4%.

$Na_2O$, $K_2O$ and $Li_2O$ are components effective for decreasing the glass transition temperature (Tg). Particularly, $Li_2O$ has a remarkably high effect on the above decrease. Since, however, these components cause the glass to suffer a large decrease in devitrification resistance and refractive index, the total content of $Na_2O$, $K_2O$ and $Li_2O$ is therefore limited to 0% or more but less than 1.5%.

$GeO_2$ has an effect similar to that of $SiO_2$, and it can be added in an amount up to 10%. When the content of $GeO_2$ exceeds 10%, the devitrification resistance decreases. The content of $GeO_2$ is therefore properly 0 to 10%. However, the above optical glass can attain desired properties without $GeO_2$. Preferably, $GeO_2$ that is expensive is therefore not incorporated.

When added in a small amount, $Bi_2O_3$ has an effect that the glass transition temperature (Tg) is decreased. When the content of $Bi_2O_3$ exceeds 20%, the devitrification resistance decreases, and it causes the glass to be colored. The content of $Bi_2O_3$ is therefore properly 0 to 20%.

When added in a small amount, $Al_2O_3$ sometimes works to improve the glass in devitrification resistance. However, the refractive index decreases at the same time. The content of $Al_2O_3$ is therefore limited to 0 to 10%.

$Ga_2O_3$ and $In_2O_3$ can be also added in an amount up to approximately 10%. However, when added, they may degrade the devitrification resistance and they are expensive materials. Desirably, therefore, $Ga_2O_3$ and $In_2O_3$ are not incorporated.

In addition to the above components, $Sb_2O_3$ and $SnO_2$ that are generally used as a clarifying agent may be added. The content of $Sb_2O_3$ is 0% or more but less than 2%, and the content of $SnO_2$ is 0 to 1%.

However, $As_2O_3$ that strongly works as a clarifying agent has toxicity, so that it is desirable to add no $As_2O_3$.

In addition to the above oxides, desirably, lead, a lead compound and radioactive substances such as U and Th are not incorporated. Further, from the viewpoint of decreasing the coloring of the glass, it is necessary to avoid the incorporation of substances that cause the glass to be colored, such as Cu, Cr, V, Fe, Ni and Co. Further, it is necessary to avoid the addition of Te, Se and Cd.

In addition, the above JP-A-53-4023 describes an optical glass containing expensive $HfO_2$ as an essential component. In the present invention, however, the intended optical glass can be obtained without incorporating $HfO_2$.

Compositions having any combinations of preferred contents of the above components in the above explanations are preferred for obtaining desired optical glasses.

In the optical glass of the present invention, the refractive index (nd) and the Abbe's number (vd) are preferably in the range of 1.8 to 2.1 (refractive index (nd)) and in the range of 20 to 40 (Abbe's number (vd)). The Abbe's number (vd) is more preferably in the range of 20 to 39, and the refractive index (nd) is more preferably 1.81 to 2.1, still more preferably 1.85 to 2.1.

The transmittance property of the optical glass of the present invention will be explained below. The transmittance is quantitatively evaluated as follows. First, a sheet glass having a thickness of 10 mm±0.1 mm is prepared. The sheet glass is formed of the above optical glass and has two surfaces that are lapped so as to be in parallel with each other. Light is allowed to perpendicularly enter the lapped surface of the above sheet glass, and the sheet glass is measured for a spectral transmittance including a surface reflection loss, in the wavelength region of 280 nm to 700 nm. A wavelength at which the spectral transmittance comes to be 70% is taken as a wavelength $\lambda_{70}$, and a wavelength at which the spectral transmittance comes to be 5% is taken as a wavelength $\lambda_5$. In the wavelength region from 280 nm to 700 nm, preferably, only one single wavelength $\lambda_{70}$ and only one single wavelength $\lambda_5$ are present. And, desirably, the optical glass exhibits a spectral transmittance of at least 5% in the entire wavelength region from $\lambda_5$ to 700 and a spectral transmittance of at least 70% in the entire wavelength region from $\lambda_{70}$ to 700 nm.

When $\lambda_{70}$ and $\lambda_5$ are adjusted to be present on a shorter wavelength side, an optical glass having the above transmittance property comes to exhibit a higher transmittance in a broad range of the visible light region.

In the present invention, the optical glass is preferably an optical glass that exhibits $\lambda_{70}$ at 460 nm or at a shorter wavelength, more preferably an optical glass that exhibits $\lambda_{70}$ at 450 nm or at a shorter wavelength, still more preferably an optical glass that exhibits $\lambda_{70}$ at 440 nm or at a shorter wavelength. For imparting the glass with various properties including the above refractive index and Abbe's number, more preferably, $\lambda_{70}$ is in the range of 350 to 460 nm, still more preferably, $\lambda_{70}$ is in the range of 350 to 450 nm, further more preferably, $\lambda_{70}$ is in the range of 350 to 440 nm.

In the present invention, the optical glass is preferably an optical glass that exhibits $\lambda_5$ at 400 nm or at a shorter wavelength, more preferably an optical glass that exhibits $\lambda_5$ at 390=m or at a shorter wavelength. For imparting the glass with various properties including the above refractive index and Abbe's number, more preferably, $\lambda_5$ is in the range of 300 to 390 nm.

Further, the optical glass of the present invention is further more preferably an optical glass that exhibits $\lambda_{70}$ and $\lambda_5$ which satisfy the above ranges at the same time.

Since $\lambda_{70}$ and $\lambda_5$ (particularly $\lambda_{70}$) are liable to change under glass melting conditions, it is necessary to take account of the melting temperature and the melting time period so that $\lambda_{70}$ and $\lambda_5$ can be on a shorter wavelength side. It is also necessary to reduce impurities that cause coloring.

Examples of more preferred compositions, preferred optical constants and preferred ranges of $\lambda_{70}$ are as described below.

(Optical Glass 1)

An optical glass containing 2 to 45% of $B_2O_3$, 0 to 30% of $SiO_2$, provided that the content of $B_2O_3$>the content of $SiO_2$, 10 to 50% of $La_2O_3$, 0 to 30% of $TiO_2$, 0 to 15% of ZnO, 0 to 15% of $ZrO_2$, 0 to 35% of $Nb_2O_5$, 0 to 35% of BaO, 0 to 5% of SrO, 0% or more but less than 8% of CaO, 0% or more but less than 13% of MgO, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$, and having a refractive index of more than 1.86 but up to 2.1, wherein the optical glass exhibits $\lambda_{70}$ at 460 nm or less.

(Optical Glass 2)

An optical glass containing 2 to 45% of $B_2O_3$, 0 to 30% of $SiO_2$, provided that the content of $B_2O_3$>the content of $SiO_2$), 10 to 50% of $La_2O_3$, 0 to 30% of $TiO_2$, 0 to 15% of ZnO, 0 to 15% of $ZrO_2$, 0 to 35% of $Nb_2O_5$, 0 to 35% of BaO, 0% or more but less than 2% of SrO, 0% or more but less than 8% of CaO, 0% or more but less than 13% of MgO, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$, and having a refractive index of 1.8 to 1.86, wherein the optical glass exhibits $\lambda_{70}$ at 460 nm or less.

(Optical Glass 3)

An optical glass containing 2 to 45% of $B_2O_3$, 0 to 30% of $SiO_2$, provided that the content of $B_2O_3$>the content of $SiO_2$), 10 to 50% of $La_2O_3$, 0 to 30% of $TiO_2$, 0 to 15% of ZnO, 0 to 15% of $ZrO_2$, 0 to 35% of $Nb_2O_5$, 0 to 35% of BaO, 0% or more but less than 1% of SrO, 0% or more but less than 8% of CaO, 0% or more but less than 13% of MgO, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$, and having a refractive index of 1.8 to 2.1, wherein the optical glass exhibits $\lambda_{70}$ at 460 nm or less.

(Optical Glass 4)

An optical glass containing 2 to 45% of $B_2O_3$, 0 to 30% of $SiO_2$, provided that the content of $B_2O_3$>the content of $SiO_2$), 10 to 50% of $La_2O_3$, 0 to 30% of $TiO_2$, 0 to 15% of ZnO, 0 to 15% of $ZrO_2$, 0 to 35% of $Nb_2O_5$, 0 to 35% of BaO, 0 to 0.8% of SrO, 0 to 7% of CaO, 0 to 12% of MgO, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0 to 0.4% of $WO_3$, 0 to 1.2% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0 to 1.8% of $Sb_2O_3$ and 0 to 1% of $SnO_2$, wherein the optical glass exhibits $\lambda_{70}$ at 460 nm or less.

(Optical Glass 5)

An optical glass containing 2 to 45% of $B_2O_3$, 0 to 30% of $SiO_2$, provided that the content of $B_2O_3$>the content of $SiO_2$), 10 to 50% of $La_2O_3$, 0 to 30% of $TiO_2$, 0 to 15% of ZnO, 0 to 15% of $ZrO_2$, 0 to 35% of $Nb_2O_5$, 0 to 35% of BaO, 0% or more but less than 1% of SrO, 0% or more but less than 8% of CaO, 0% or more but less than 13% of MgO, provided that the total content of BaO, SrO, CaO and MgO is 0 to 40%, 0 to 20% of $Gd_2O_3$, 0% or more but less than 2% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$.

(Optical Glass 6)

An optical glass that is included in the above optical glass 5 and which contains 3 to 24% of $B_2O_3$, 0 to 18% of $SiO_2$, provided that the weight ratio of the content of $B_2O_3$/the content of $SiO_2$ is at least 1.1 or that no $SiO_2$ is contained, 18 to 47% of $La_2O_3$, 0 to 26% of $TiO_2$, 0 to 12% of ZnO, 0 to 10% of $ZrO_2$, 0 to 30% of $Nb_2O_5$, 0 to 32% of BaO, 0 to 10% of $Gd_2O_3$ and 0 to 4% of $Yb_2O_3$.

(Optical Glass 7)

An optical glass that is included in the above optical glass 5 or 6 and which contains 1 to 5% of ZnO.

(Optical Glass 8)

An optical glass that is included in any one of the above optical glasses 1 to 7 and wherein the total content of $B_2O_3$, $SiO_2$, $La_2O_3$, ZnO, $ZrO_2$, $Nb_2O_5$, $TiO_2$, BaO, CaO, SrO, $Gd_2O_3$, $Y_2O_3$, $Ta_2O_5$, $WO_3$, $Na_2O$, $K_2O$, $Li_2O$, $GeO_2$, $Yb_2O_3$, $Sb_2O_3$ and $SnO_2$ is 99% or more, more preferably 100%.

(Optical Glass 9)

An optical glass that is included in the above optical glass 8 and where the total content of $B_2O_3$, $SiO_2$, $La_2O_3$, ZnO, $ZrO_2$, $Nb_2O_5$, $TiO_2$, BaO and $Sb_2O_3$ is 99% or more, more preferably 100%.

(Optical Glass 10)

An optical glass that is included in the above optical glass 9 and which contains all of $B_2O_3$, $SiO_2$, $La_2O_3$, ZnO, $ZrO_2$, $Nb_2O_5$, $TiO_2$ and BaO.

(Optical Glass 11)

An optical glass that is included in any one of the above optical glasses 1 to 11 and which contains $TiO_2$. In this optical glass, the weight ratio of the content of $Nb_2O_5$/the content of $TiO_2$ is preferably from 0 to 7, more preferably from 0 to 6. In this constitution, an optical glass to be colored to less degree can be obtained.

Having the above transmittance property, the optical glass of the present invention exhibits a high transmittance to light in a short wavelength region of the visible light region, so that a well-balanced image-sensing optical system can be easily constituted. The optical glass of the present invention is particularly suitable as a material for an optical element such as a lens for constituting an image-sensing system for a solid image-sensing device.

The liquidus temperature of the optical glass of the present invention will be explained below. In the optical glass of the present invention, the liquidus temperature is preferably 1,250° C. or lower, more preferably 1,200° C. or lower. As far as the stability of the glass is concerned, an optical glass that shows no liquidus temperature is preferred. For imparting the glass with the above various properties, however, the optical glass of the present invention has a liquidus temperature of 900 to 1,200° C.

The press-molding glass gob of the present invention and the method for preparation thereof will be explained below. The press-molding glass gob is a glass molded material that is to be softened under heat and press-molded, and it is also called a press-molding preform (preform for press-molding). The weight and form of the press-molding glass gob are determined as required depending upon a press-molded product as an end product. The press-molding glass gob of the present invention is formed of the above optical glass and has various properties that reflect the various properties of the optical glass of the present invention.

In the method for preparing the above press-molding glass gob, a molten glass is shaped into a moldable glass gob formed of the above optical glass. First, glass raw materials for obtaining the optical glass of the present invention are formulated, dissolved, clarified and homogenized to obtain a homogeneous molten glass free of gas bubbles and foreign matter. Then, the molten glass is flowed out from a flow pipe made of a platinum alloy, or the like. For flowing the molten glass out, the temperature of the flow pipe, etc., are arranged such that the glass is not devitrified. The molten glass that flows out is cast into a receiving mold or a casting mold to shape the molten glass into a predetermined form. Methods suitable for the above shaping will be described as examples.

The first shaping method is a method in which a plurality of receiving molds are consecutively transferred into a place below the flow pipe to receive a molten glass gob having a predetermined weight on each receiving mold and each glass gob is cooled while each is shaped. In this method, a forward end of the molten glass flow flowing out of the pipe is supported on a receiving mold, and the receiving mold is rapidly moved down timely when a molten glass gob having a predetermined weight can be separated. In this case, the supply of the molten glass onto the receiving mold does not keep up with the downward movement of the receiving mold, and a leading molten glass flow is separated from a molten glass on the backward side of the flow, so that a predetermined weight of the molten glass gob can be received on the receiving mold. In this manner, a glass can be shaped without leaving a cut mark (shear mark) formed when a molten glass flow is cut with a blade. In the above first method, a glass gob having a weight equivalent to, or a little larger than, a press-molding glass gob can be shaped.

When a glass gob having a weight equivalent to the weight of one press-molding glass gob is shaped, this glass gob can be used as a press-molding glass gob. In this case, it is preferred to cool the glass gob at such a rate that the glass is not broken.

When a glass gob having a weight larger than the weight of one press-molding glass gob is shaped, this glass gob is annealed to reduce strains and then machined to complete a glass gob having a weight equivalent to the weight of one press-molding glass gob, and the completed glass gob is used as a press-molding glass gob. According to this method, glass gobs are prepared beforehand, and the glass gobs are machined depending upon demands to adjust their weights, whereby there can be supplied press-molding glass gobs that can be press-molded into optical elements having various sizes. For the above machining, barrel lapping is preferred.

Further, when the above press-molding glass gob is used for precision press-molding, a press-molding glass gob that is shaped without any machining is preferred.

The second shaping method is a method in which a molten glass is cast into a casting mold at a constant speed, the casting mold having a nearly horizontal bottom surface and a pair of sidewalls facing each other in parallel across the bottom surface. A cast molten glass uniformly spreads within the casting mold to be shaped into a glass sheet having a width determined by the distance of the above pair of sidewalls. The thus-formed glass sheet is drawn out from an opening portion of the casting mold at a speed depending upon a molten glass supply speed such that a sheet having a uniform thickness and a uniform width can be obtained. The thus-obtained glass sheet is annealed to reduce strains and then cut to a predetermined size. The thus-obtained glass piece is called "cut piece". The cut piece is chamfered as required or machined so as to have a weight equivalent to the weight to a press-molding glass gob. For chamfering the cut piece or machining the cut piece for adjusting its weight, barrel lapping is preferred.

In any one of the above methods, there can be obtained the press-molding glass gob of the present invention, which has a predetermined weight and is formed of the optical glass of the present invention. In addition, a mold release film may be formed on the press-molding glass gob, or a powdered mold release agent may be applied thereto, as required for making it easy to separate a molded product from a mold when the press-molding is carried out. However, the powdered mold release agent is undesirable for precision press-molding, since the mold release agent is transferred to the glass forming the glass gob (press-molded product).

The optical element of the present invention will be explained below. The optical element of the present invention is formed of the above optical glass of the present invention. The optical element therefore has various properties of the above optical glass. As a typical embodiment, the optical element of the present invention has a refractive index (nd) of 1.8 to 2.1 and an Abbe's number (vd) of 20 to 40, and also commonly has the property of a high transmittance on a short wavelength side of the visible light region. The optical element formed of the above optical glass preferably exhibits $\lambda_{70}$ and $\lambda_5$ in the above-described ranges, exhibits a high transmittance to visible light and is free from coloring. This optical element is suitable for optical systems of cameras using a solid image-sensing device such as a digital camera, a video camera and a camera incorporated into a mobile item.

The optical element of the present invention includes various lenses such as a spherical lens, an aspherical lens, a microlens and a lens array, a prism and a diffraction grating. The optical element of the present invention may be provided with an optical thin film such as an anti-reflection film, a partial reflection film, a high reflection film or the like as required.

The method for producing the optical element of the present invention will be explained below. In the method for producing the optical element of the present invention, the above press-molding glass gob or a press-molding glass gob prepared by the above preparation method is softened under heat and press-molded with a press mold, to produce the optical element.

The optical element has an optical-function surface having an optical function, which refracts, transmits, diffract or reflects light. The press-molding method can be largely classified into the following two methods depending upon how the above optical-function surface is formed.

The first method is a method in which a press-molded product having a form similar to an end optical element and having a larger size than the optical element is formed by press-molding. The press-molded product is polished and/or lapped, and the surface of the optical element including the optical-function surface is formed by machining. Since the machining is carried out after the press-molding, it is preferred to anneal the press-molded product to decrease strains in order to prevent the breaking of the glass during the machining. In this method, the press-molding can be carried out in atmosphere, so that the above powdered mold release agent may be used.

The second method is a so-called precision press-molding method, in which the molding surface of a press mold is precisely worked so as to have an inversion form of the form of an end optical element, a mold release film is optionally formed, and the form of the above molding surface is precisely transferred, by press molding, to a glass gob that is softened under heat. According to this method, the optical-function surface can be formed by the press-molding without polishing or lapping. However, it is required to carry out the press-molding in a non-oxidizing atmosphere such as a nitrogen gas atmosphere.

In the above second method, it is not essential to machine the press-molded product, so that a strain may remain so long as the strain has no optical influence, and the annealing of the press-molded product can be omitted. As a method for producing an optical element, further, there is another method in which a glass in a molten state is fed into a press mold to produce a press-molded product having a form similar to the form of an optical element, and the press-molded product is polished and lapped to complete an optical element.

The refractive index (nd) and the Abbe's number (vd) of the optical element slightly change due to a thermal history during the process of producing the optical element. For producing an optical element having precisely determined optical constants, the glass composition and the thermal history during the production process can be adjusted by taking account of the above change in refractive index (nd) and Abbe's number (vd). In this manner, there can be provided an optical element that has predetermined optical constants and an excellent transmittance and which is particularly suitable as an optical part for a machine, equipment or an item on which a solid image-sensing device, or the like is mounted.

EXAMPLES

The present invention will be explained further in detail with reference to Examples hereinafter, while the present invention shall not be limited by these Examples.

Examples 1–11

A raw material batch formulated to give 100 g of a glass having a composition shown in Table 1 or 2 was placed in a crucible formed of platinum and melted in a furnace set at 1,300° C., and a molten glass is stirred, clarified, then cast into a casting mold made of iron, maintained at a temperature around a glass transition temperature (Tg) for 2 hours and gradually cooled, to give an optical glass.

The thus-obtained optical glass in each Example was measured for a refractive index (nd), an Abbe's number (vd), a liquidus temperature (LT) and $\lambda_{70}$ and $\lambda_5$ as follows. Tables 1 and 2 show the results.

(1) Refractive Index (nd) and Abbe's Number (vd)

An optical glass obtained by cooling at a temperature-decrease rate of −30° C./h was measured.

(2) Liquidus Temperature (LT)

A plurality of crucibles made of platinum were prepared, and 50 cm³ of glass was placed in each crucible. The crucibles with the glass in them were placed in furnaces in which the temperature was set at intervals of 10° C. and held under different temperature conditions for 2 hours. After cooled, an inside of each glass was observed through a microscope having a magnification of 100 times for the presence or absence of a crystal, on the basis of which the liquidus temperature was determined.

(3) $\lambda_{70}$ and $\lambda_5$

A 10 mm thick lapped sample was measured for spectral transmittances, and a wavelength (nm) at which the sample exhibited a transmittance of 5% was determined as $\lambda_5$ and a wavelength (nm) at which the sample exhibited a transmittance of 70% was determined as $\lambda_{70}$.

TABLE 1

|  |  | Examples | | | | | |
|---|---|---|---|---|---|---|---|
|  |  | 1 | 2 | 3 | 4 | 5 | 6 |
| Glass composition | $B_2O_3$ | 13.16 | 8.20 | 13.16 | 13.04 | 10.50 | 13.00 |
| (wt %) | $SiO_2$ | 6.63 | 6.00 | 6.63 | 6.57 | 6.50 | 10.00 |
|  | $La_2O_3$ | 19.03 | 49.00 | 36.19 | 35.85 | 34.00 | 37.00 |
|  | ZnO | 7.21 | 0.00 | 7.21 | 2.68 | 3.00 | 3.00 |
|  | $ZrO_2$ | 5.68 | 5.40 | 7.05 | 4.28 | 7.00 | 7.00 |
|  | $Nb_2O_5$ | 21.59 | 0.00 | 3.85 | 6.76 | 7.00 | 4.00 |
|  | $TiO_2$ | 3.94 | 4.40 | 9.04 | 12.44 | 16.00 | 9.00 |
|  | BaO | 21.94 | 0.00 | 16.86 | 18.38 | 16.00 | 17.00 |
|  | CaO | 0.00 | 0.00 | 0.00 | 0.00 | 0.00 | 0.00 |
|  | SrO | 0.00 | 0.00 | 0.00 | 0.00 | 0.00 | 0.00 |
|  | (RO) | (21.94) | (0.00) | (16.86) | (18.38) | (16.00) | (17.00) |
|  | $Gd_2O_3$ | 0.00 | 0.00 | 0.00 | 0.00 | 0.00 | 0.00 |
|  | $Y_2O_3$ | 0.00 | 1.00 | 0.00 | 0.00 | 0.00 | 0.00 |
|  | $Ta_2O_5$ | 0.00 | 18.00 | 0.00 | 0.00 | 0.00 | 0.00 |

TABLE 1-continued

|  |  | Examples | | | | | |
|---|---|---|---|---|---|---|---|
|  |  | 1 | 2 | 3 | 4 | 5 | 6 |
|  | $WO_3$ | 0.30 | 0.00 | 0.00 | 0.00 | 0.00 | 0.00 |
|  | $Na_2O$ | 0.00 | 0.00 | 0.00 | 0.00 | 0.00 | 0.00 |
|  | $K_2O$ | 0.52 | 0.00 | 0.00 | 0.00 | 0.00 | 0.00 |
|  | $Li_2O$ | 0.00 | 0.00 | 0.00 | 0.00 | 0.00 | 0.00 |
|  | ($R_2O$) | (0.52) | (0.00) | (0.00) | (0.00) | (0.00) | (0.00) |
|  | $GeO_2$ | 0.00 | 5.00 | 0.00 | 0.00 | 0.00 | 0.00 |
|  | $Bi_2O_3$ | 0.00 | 0.00 | 0.00 | 0.00 | 0.00 | 0.00 |
|  | $Yb_2O_3$ | 0.00 | 3.00 | 0.00 | 0.00 | 0.00 | 0.00 |
|  | Total | 100.00 | 100.00 | 100.00 | 100.00 | 100.00 | 100.00 |
| P. Properties | nd | 1.8741 | 1.9225 | 1.87247 | 1.89803 | 1.94875 | 1.85403 |
|  | νd | 31.27 | 35.95 | 34.21 | 31.14 | 28.25 | 34.95 |
|  | $\lambda_{70}$ (nm) | 397 | 405 | 402 | 407 | 418 | 391 |
|  | $\lambda_5$ (nm) | 353 | 364 | 352 | 360 | 364 | 353 |
|  | LT (° C.) | 1160 | 1050 | 1080 | 1100 | 1150 | 1090 |

P. Properties = Physical Properties

TABLE 2

|  |  | Examples | | | | |
|---|---|---|---|---|---|---|
|  |  | 7 | 8 | 9 | 10 | 11 |
| Glass composition | $B_2O_3$ | 8.00 | 12.70 | 23.00 | 13.2 | 8.0 |
| (wt %) | $SiO_2$ | 6.00 | 6.30 | 0.00 | 6.6 | 6.0 |
|  | $La_2O_3$ | 34.00 | 33.60 | 40.00 | 36.2 | 34.0 |
|  | ZnO | 2.50 | 2.50 | 5.00 | 2.7 | 2.0 |
|  | $ZrO_2$ | 6.50 | 6.50 | 5.00 | 5.7 | 6.5 |
|  | $Nb_2O_5$ | 8.50 | 2.00 | 17.00 | 5.4 | 8.0 |
|  | $TiO_2$ | 19.00 | 5.00 | 5.00 | 13.4 | 20.5 |
|  | BaO | 15.50 | 31.40 | 0.00 | 16.8 | 15.0 |
|  | CaO | 0.00 | 0.00 | 0.00 | 0.0 | 0.0 |
|  | SrO | 0.00 | 0.00 | 0.00 | 0.0 | 0.0 |
|  | (RO) | (15.50) | (31.40) | (0.00) | (16.8) | (15.0) |
|  | $Gd_2O_3$ | 0.00 | 0.00 | 0.00 | 0.0 | 0.0 |
|  | $Y_2O_3$ | 0.00 | 0.00 | 0.00 | 0.0 | 0.0 |
|  | $Ta_2O_5$ | 0.00 | 0.00 | 5.00 | 0.0 | 0.0 |
|  | $WO_3$ | 0.00 | 0.00 | 0.00 | 0.0 | 0.0 |
|  | $Na_2O$ | 0.00 | 0.00 | 0.00 | 0.0 | 0.0 |
|  | $K_2O$ | 0.00 | 0.00 | 0.00 | 0.0 | 0.0 |
|  | $Li_2O$ | 0.00 | 0.00 | 0.00 | 0.0 | 0.0 |
|  | ($R_2O$) | (0.00) | (0.00) | (0.00) | (0.0) | (0.0) |
|  | $GeO_2$ | 0.00 | 0.00 | 0.00 | 0.0 | 0.0 |
|  | $Bi_2O_3$ | 0.00 | 0.00 | 0.00 | 0.0 | 0.0 |
|  | $Yb_2O_3$ | 0.00 | 0.00 | 0.00 | 0.0 | 0.0 |
|  | Total | 100.00 | 100.00 | 100.00 | 100.0 | 100.0 |
| P. Properties | nd | 1.9945 | 1.82546 | 1.90564 | 1.90047 | 2.00030 |
|  | νd | 25.88 | 38.6 | 31.71 | 30.71 | 25.51 |
|  | $\lambda_{70}$ (nm) | 437 | 407 | 424 | 408 | 440 |
|  | $\lambda_5$ (nm) | 370 | 341 | 362 | 362 | 372 |
|  | LT (° C.) | 1150 | 1090 | 1050 | 1080 | 1150 |

P. Properties = Physical Properties

Tables 1 and 2 show that the optical glasses of the present invention shown in Examples had a refractive index (nd) in the range of 1.8 to 2.1 and an Abbe's number (νd) in the range of 20 to 40.

Example 12

Each of the clarified and homogenized molten glasses obtained from the glasses in Examples 1 to 11 was independently cast from a pipe formed of platinum into a casting mold having one sidewall opened, at a constant flow rate, and while a glass sheet having a constant thickness and a constant width was formed, the glass sheet was drawn out of the opening portion of the casting mold. The glass sheet that was drawn out was annealed in an annealing furnace to decrease strains. In this manner, there were obtained glass sheets of the optical glasses of the above Examples 1 to 11, which had strains decreased and were homogenous, colorless and free of foreign matter.

Each glass sheet was cut into small cubes to obtain a plurality of cut pieces having identical dimensions. Further, a plurality of the cut pieces were barrel lapped so as to have an intended weight, and used as press-molding glass gobs.

Besides the above method, there may be employed a method in which the above molten glass is flowed out from a nozzle formed of platinum at a constant speed, many receiving molds are transferred into a place below the nozzle one after another, to receive a molten glass gob on each receiving mold, each molten glass gob is shaped into a spherical form or a sphere-flattened form, annealed, then barrel-lapped to adjust the weight of each to an intended weight, and the thus formed glass gobs are used as press-molding glass gobs.

Example 13

A powdered mold release agent was applied to the entire surface of each glass gob obtained in Example 12, and each glass gob was independently softened under heat with a heater and then charged into a press mold having an upper mold member and a lower mold member. The glass gobs were respectively pressed with the press mold to give lens blanks having the form of a lens each.

Then, the lens blanks were annealed to remove strains and adjust their refractive indexes and Abbe's numbers to predetermined values. The cooled lens blanks were polished and lapped to produce lenses. The above steps in series were carried out in atmosphere.

The thus-obtained lenses were excellent in transmittance properties and had various properties of the optical glasses of Examples 1 to 11. An anti-reflection film may be formed on each lens as required.

The above lenses can constitute an excellent image-sensing optical system.

INDUSTRIAL APPLICABILITY

The optical glass of the present invention has a high refractive index and has its coloring decreased, so that it can be suitably used in an image-sensing unit such as a digital camera using CCD as an image-sensing device.

What is claimed is:

1. An optical glass comprising, by weight %, 2 to 45% of $B_2O_3$, 0 to 30% of $SiO_2$ provided that the content of $B_2O_3$>the content of $SiO_2$, 10 to 50% of $La_2O_3$, 0 to 30% of $TiO_2$, 0 to 15% of $ZnO$, 0 to 15% of $ZrO_2$, 0 to 35% of $Nb_2O_5$, 0 to 35% of $BaO$, 0 to 5% of $SrO$, 0% or more but less than 8% of $CaO$, 0% or more but less than 13% of $MgO$, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$.

2. The optical glass of claim 1, which has an refractive index (nd) of 1.8 to 2.1 and an Abbe's number (vd) of 20 to 40.

3. The optical glass of claim 1, which contains 2 to 45% of $B_2O_3$, 0 to 30% of $SiO_2$, provided that the content of $B_2O_3$>the content of $SiO_2$, 10 to 50% of $La_2O_3$, 0 to 30% of $TiO_2$, 0 to 15% of $ZnO$, 0 to 15% of $ZrO_2$, 0 to 35% of $Nb_2O_5$, 0 to 35% of $BaO$, 0 to 5% of $SrO$, 0% or more but less than 8% of $CaO$, 0% or more but less than 13% of $MgO$, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$, and has a refractive index of more than 1.86 but up to 2.1, wherein the optical glass exhibits $\lambda_{70}$ at 460 nm or less.

4. The optical glass of claim 1, which contains 2 to 45% of $B_2O_3$, 0 to 30% of $SiO_2$, provided that the content of $B_2O_3$>the content of $SiO_2$, 10 to 50% of $La_2O_3$, 0 to 30% of $TiO_2$, 0 to 15% of $ZnO$, 0 to 15% of $ZrO_2$, 0 to 35% of $Nb_2O_5$, 0 to 35% of $BaO$, 0% or more but less than 2% of $SrO$, 0% or more but less than 8% of $CaO$, 0% or more but less than 13% of $MgO$, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$, and has a refractive index of 1.8 to 1.86, wherein the optical glass exhibits $\lambda_{70}$ at 460 nm or less.

5. The optical glass of claim 1, which contains 2 to 45% of $B_2O_3$, 0 to 30% of $SiO_2$, provided that the content of $B_2O_3$>the content of $SiO_2$, 10 to 50% of $La_2O_3$, 0 to 30% of $TiO_2$, 0 to 15% of $ZnO$, 0 to 15% of $ZrO_2$, 0 to 35% of $Nb_2O_5$, 0 to 35% of $BaO$, 0% or more but less than 1% of $SrO$, 0% or more but less than 8% of $CaO$, 0% or more but less than 13% of $MgO$, provided that the total content of BaO, SrO, CaO and MgO is 0 to 40%, 0to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$, and has a refractive index of 1.8 to 2.1, wherein the optical glass exhibits $\lambda_{70}$ at 460 nm or less.

6. The optical glass of claim 1, which contains 2 to 45% of $B_2O_3$, 0 to 30% of $SiO_2$, provided that the content of $B_2O_3$>the content of $SiO_2$, 10 to 50% of $La_2O_3$, 0 to 30% of $TiO_2$, 0 to 15% of $ZnO$, 0 to 15% of $ZrO_2$, 0 to 35% of $Nb_2O_5$, 0 to 35% of $BaO$, 0 to 0.8% of $SrO$, 0 to 7% of $CaO$, 0 to 12% of $MgO$, provided that the total content of BaO, SrO, GaO and MgO is 0 to 40%, 0 to 20% of $Gd_2O_3$, 0 to 15% of $Y_2O_3$, 0 to 18% of $Ta_2O_5$, 0 to 0.4% of $WO_3$, 0 to 1.2% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0 to 1.8% of $Sb_2O_3$ and 0 to 1% of $SnO_2$, wherein the optical glass exhibits $\lambda_{70}$ at 460 nm or less.

7. The optical glass of claim 1, which contains 2 to 45% of $B_2O_3$, 0 to 30% of $SiO_2$, provided that the content of $B_2O_3$>the content of $SiO_2$, 10 to 50% of $La_2O_3$, 0 to 30% of $TiO_2$, 0 to 15% of $ZnO$, 0 to 15% of $ZrO_2$, 0 to 35% of $Nb_2O_5$, 0 to 35% of $BaO$, 0% or more but less than 1% of $SrO$, 0% or more but less than 8% of $CaO$, 0% or more but less than 13% of $MgO$, provided that the total content of BaO, SrO, CaO and MgO is 0 to 40%, 0 to 20% of $Gd_2O_3$, 0% or more but less than 2% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$.

8. The optical glass of claim 7, which contains 3 to 24% of $B_2O_3$, 0 to 18% of $SiO_2$, provided that the weight ratio of the content of $B_2O_3$/the content of $SiO_2$ is at least 1.1 or that no $SiO_2$ is contained, 18 to 47% of $La_2O_3$, 0 to 26% of $TiO_2$, 0 to 12% of $ZnO$, 0 to 10% of $ZrO_2$, 0 to 30% of $Nb_2O_5$, 0 to 32% of $BaO$, 0 to 10% of $Gd_2O_3$ and 0 to 4% of $Yb_2O_3$.

9. The optical glass of claim 7 or 8, which contains 1 to 5% of ZnO.

10. The optical glass of claim 1, wherein the total content of $B_2O_3$, $SiO_2$, $La_2O_3$, $ZnO$, $ZrO_2$, $Nb_2O_5$, $TiO_2$, $BaO$, $GaO$, $SrO$, $Gd_2O_3$, $Y_2O_3$, $Ta_2O_5$, $WO_3$, $Na_2O$, $K_2O$, $Li_2O$, $GeO_2$, $Yb_2O_3$, $Sb_2O_3$ and $SnO_2$ is 99% or more.

11. The optical glass of claim 10, wherein the total content of $B_2O_3$, $SiO_2$, $La_2O_3$, $ZnO$, $ZrO_2$, $Nb_2O_5$, $TiO_2$, $BaO$ and $Sb_2O_3$ is 99% or more.

12. The optical glass of claim 11, which contains all of $B_2O_3$, $SiO_2$, $La_2O_3$, $ZnO$, $ZrO_2$, $Nb_2O_5$, $TiO_2$ and BaO.

13. The optical glass of claim 1, which contains $TiO_2$.

14. A press-molding glass gob which is formed of the optical glass recited in any one of claim 1, 16 or 18 and is to be softened under heat and press-molded.

15. An optical element formed of the optical glass recited in any one of claim 1, 16 or 18.

16. An optical glass having a glass composition having a co-presence of $B_2O_3$, $SiO_2$, $La_2O_3$, $TiO_2$, $ZrO_2$, $Nb_2O_5$ and BaO and comprising, by weight %, 2 to 45% of $B_2O_3$, 1 to 18% of $SiO_2$ provided that the content of $B_2O_3$>the content of $SiO_2$, 10 to 50% of $La_2O_3$, 1 to 26% of $TiO_2$, 0 to 15% of ZnO, 1 to 10% of $ZrO_2$, 1 to 30% of $Nb_2O_5$, 1 to 32% of BaO, 0 to 5% of SrO, 0% or more but less than 8% of CaO, 0% or more but less than 13% of MgO, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$, the optical glass having a refractive index (nd) of 1.8 to 2.1 and an Abbe's number (vd) of 20 to 40.

17. The optical glass of claim 16, which contains over 0% but not more than 5% of ZnO.

18. An optical glass having a glass composition having a co-presence of $B_2O_3$, $SiO_2$, $La_2O_3$, $TiO_2$, $Nb_2O_5$ and BaO and comprising, by weight %, 2 to 45% of $B_2O_3$, 1 to 18% of $SiO_2$ provided that the content of $B_2O_3$>the content of $SiO_2$, 10 to 50% of $La_2O_3$, 1 to 26% of $TiO_2$, 0 to 15% of ZnO, 0 to 10% of $ZrO_2$, 1 to 30% of $Nb_2O_5$, 1 to 32% of BaO, 0 to 5% of SrO, 0% or more but less than 8% of CaO, 0% or more but less than 13% of MgO, provided that the total content of BaO, SrO, CaO and MgO is 0 to 40%, 0 to 20% of $Gd_2O_3$, 0 to 15% of $Y_2O_3$, 0 to 18% of $Ta_2O_5$, 0% or more but less than 0.5% of $WO_3$, 0% or more but less than 1.5% of a total of $Na_2O$, $K_2O$ and $Li_2O$, 0 to 10% of $GeO_2$, 0 to 20% of $Bi_2O_3$, 0 to 10% of $Yb_2O_3$, 0 to 10% of $Al_2O_3$, 0% or more but less than 2% of $Sb_2O_3$ and 0 to 1% of $SnO_2$, the optical glass having a refractive index (nd) of 1.8 to 2.1 and an Abbe's number (vd) of 20 to 40.

\* \* \* \* \*